United States Patent
Smith et al.

(10) Patent No.: US 10,863,002 B2
(45) Date of Patent: *Dec. 8, 2020

(54) SYSTEM FOR PROVIDING A CONTINUOUS COMMUNICATION LINK WITH A SYMBOL READING DEVICE

(71) Applicant: Hand Held Products, Inc., Fort Mill, SC (US)

(72) Inventors: Taylor Smith, Charlotte, NC (US); Mark Schmidt, Waxhaw, NC (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 104 days.

This patent is subject to a terminal disclaimer.

(21) Appl. No.: 15/933,686

(22) Filed: Mar. 23, 2018

(65) Prior Publication Data
US 2018/0213064 A1 Jul. 26, 2018

Related U.S. Application Data

(63) Continuation of application No. 13/902,242, filed on May 24, 2013, now Pat. No. 9,930,142.

(51) Int. Cl.
*G06F 15/177* (2006.01)
*H04L 29/06* (2006.01)
*G06K 7/10* (2006.01)
*G06K 17/00* (2006.01)

(52) U.S. Cl.
CPC .......... *H04L 67/42* (2013.01); *G06K 7/10881* (2013.01); *G06K 17/0022* (2013.01)

(58) Field of Classification Search
None
See application file for complete search history.

(56) References Cited

U.S. PATENT DOCUMENTS

| | | | |
|---|---|---|---|
| 6,832,725 | B2 | 12/2004 | Gardiner et al. |
| 7,128,266 | B2 | 10/2006 | Zhu et al. |
| 7,159,783 | B2 | 1/2007 | Walczyk et al. |
| 7,413,127 | B2 | 8/2008 | Ehrhart et al. |
| 7,726,575 | B2 | 6/2010 | Wang et al. |
| 8,294,969 | B2 | 10/2012 | Plesko |
| 8,317,105 | B2 | 11/2012 | Kotlarsky et al. |
| 8,322,622 | B2 | 12/2012 | Liu |

(Continued)

FOREIGN PATENT DOCUMENTS

| | | |
|---|---|---|
| WO | 2013/173985 A1 | 11/2013 |
| WO | 2013163789 A1 | 11/2013 |
| WO | 2014/019130 A1 | 2/2014 |

OTHER PUBLICATIONS

Extended European Search and Opinion Report for Application No. 14167806.0, dated Nov. 17, 2014, 8 pages.

(Continued)

*Primary Examiner* — Phuoc H Nguyen
(74) *Attorney, Agent, or Firm* — Alston & Bird LLP (57) ABSTRACT

The disclosure embraces a system and method for providing a continuous communication link between a server computer and a symbol reading device, and a novel symbol reading device adapted for use in such a system. The system greatly simplifies the remote management, diagnostic evaluation, and monitoring of symbol reading devices, especially those devices connected to host devices that are not PC-based or running a complete operating system.

20 Claims, 4 Drawing Sheets

(56) References Cited

U.S. PATENT DOCUMENTS

| | | |
|---|---|---|
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |

(56) References Cited

U.S. PATENT DOCUMENTS

| | | |
|---|---|---|
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein |
| 9,158,340 B2 | 10/2015 | Reed et al. |
| 9,158,952 B2 | 10/2015 | Jovanovski et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Wangu |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van Horn et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,443,123 B2 | 1/2016 | Hejl |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |
| 9,262,662 B2 | 2/2016 | Chen et al. |
| 9,269,036 B2 | 2/2016 | Bremer |
| 9,270,782 B2 | 2/2016 | Hala et al. |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,286,496 B2 | 3/2016 | Smith |
| 9,292,723 B2 | 3/2016 | Lu et al. |
| 9,297,900 B2 | 3/2016 | Jiang |
| 9,298,964 B2 | 3/2016 | Li et al. |
| 9,301,427 B2 | 3/2016 | Feng et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| D757,009 S | 5/2016 | Oberpriller et al. |
| 9,342,723 B2 | 5/2016 | Liu et al. |
| 9,342,724 B2 | 5/2016 | McCloskey |
| 9,361,882 B2 | 6/2016 | Ressler et al. |
| 9,365,381 B2 | 6/2016 | Colonel et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,360,304 B2 | 7/2016 | Chang et al. |
| 9,383,848 B2 | 7/2016 | Daghigh |
| 9,384,374 B2 | 7/2016 | Bianconi |
| 9,390,596 B1 | 7/2016 | Todeschini |
| D762,604 S | 8/2016 | Fitch et al. |
| 9,411,386 B2 | 8/2016 | Sauerwein |
| 9,412,242 B2 | 8/2016 | Van Horn et al. |
| 9,418,269 B2 | 8/2016 | Havens et al. |
| 9,418,270 B2 | 8/2016 | Van Volkinburg et al. |
| 9,423,318 B2 | 8/2016 | Lui et al. |
| D766,244 S | 9/2016 | Zhou et al. |
| 9,443,222 B2 | 9/2016 | Singel et al. |
| 9,454,689 B2 | 9/2016 | McCloskey et al. |
| 9,464,885 B2 | 10/2016 | Lloyd et al. |
| 9,465,967 B2 | 10/2016 | Xian et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,488,986 B1 | 11/2016 | Solanki |
| 9,489,782 B2 | 11/2016 | Payne et al. |
| 9,490,540 B1 | 11/2016 | Davies et al. |
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| 9,530,038 B2 | 12/2016 | Xian et al. |

(56) References Cited

U.S. PATENT DOCUMENTS

| | | | |
|---|---|---|---|
| D777,166 S | 1/2017 | Bidwell et al. | |
| 9,558,386 B2 | 1/2017 | Yeakley | |
| 9,572,901 B2 | 2/2017 | Todeschini | |
| 9,606,581 B1 | 3/2017 | Howe et al. | |
| D783,601 S | 4/2017 | Schulte et al. | |
| D785,617 S | 5/2017 | Bidwell et al. | |
| D785,636 S | 5/2017 | Oberpriller et al. | |
| 9,646,189 B2 | 5/2017 | Lu et al. | |
| 9,646,191 B2 | 5/2017 | Unemyr et al. | |
| 9,652,648 B2 | 5/2017 | Ackley et al. | |
| 9,652,650 B2 | 5/2017 | Pasik | |
| 9,652,653 B2 | 5/2017 | Todeschini et al. | |
| 9,656,487 B2 | 5/2017 | Ho et al. | |
| 9,659,198 B2 | 5/2017 | Giordano et al. | |
| D790,505 S | 6/2017 | Vargo et al. | |
| D790,546 S | 6/2017 | Zhou et al. | |
| 9,680,282 B2 | 6/2017 | Hanenburg | |
| 9,697,401 B2 | 7/2017 | Feng et al. | |
| 9,701,140 B1 | 7/2017 | Alaganchetty et al. | |
| 9,930,142 B2 | 3/2018 | Smith et al. | |
| 2002/0128037 A1* | 9/2002 | Schmidt | H04M 1/725 455/553.1 |
| 2003/0209605 A1 | 11/2003 | Walczyk et al. | |
| 2004/0206821 A1* | 10/2004 | Longacre, Jr. | G06K 7/10851 235/462.07 |
| 2004/0254013 A1* | 12/2004 | Quraishi | G07F 17/32 463/29 |
| 2004/0256465 A1* | 12/2004 | Longacre, Jr. | G06K 7/10544 235/462.49 |
| 2005/0044172 A1 | 2/2005 | Philyaw | |
| 2006/0006231 A1 | 1/2006 | Anson et al. | |
| 2006/0026304 A1* | 2/2006 | Price | G06F 8/65 710/8 |
| 2007/0005849 A1* | 1/2007 | Oliver | G06F 3/03545 710/72 |
| 2007/0063048 A1 | 3/2007 | Havens et al. | |
| 2008/0035734 A1 | 2/2008 | Challa et al. | |
| 2008/0093456 A1 | 4/2008 | Pasik et al. | |
| 2009/0134221 A1 | 5/2009 | Zhu et al. | |
| 2010/0177076 A1 | 7/2010 | Essinger et al. | |
| 2010/0177080 A1 | 7/2010 | Essinger et al. | |
| 2010/0177707 A1 | 7/2010 | Essinger et al. | |
| 2010/0177749 A1 | 7/2010 | Essinger et al. | |
| 2011/0169999 A1 | 7/2011 | Grunow et al. | |
| 2011/0202554 A1 | 8/2011 | Powilleit et al. | |
| 2011/0246284 A1* | 10/2011 | Chaikin | G06Q 20/105 705/14.38 |
| 2012/0093039 A1* | 4/2012 | Rofougaran | H04J 1/00 370/278 |
| 2012/0111946 A1 | 5/2012 | Golant | |
| 2012/0168512 A1 | 7/2012 | Kotlarsky et al. | |
| 2012/0193423 A1 | 8/2012 | Samek | |
| 2012/0203647 A1 | 8/2012 | Smith | |
| 2012/0223141 A1 | 9/2012 | Good et al. | |
| 2013/0043312 A1 | 2/2013 | Van Horn | |
| 2013/0075168 A1 | 3/2013 | Amundsen et al. | |
| 2013/0175341 A1 | 7/2013 | Kearney et al. | |
| 2013/0175343 A1 | 7/2013 | Good | |
| 2013/0257744 A1 | 10/2013 | Daghigh et al. | |
| 2013/0257759 A1 | 10/2013 | Daghigh | |
| 2013/0270346 A1 | 10/2013 | Xian et al. | |
| 2013/0287258 A1 | 10/2013 | Kearney | |
| 2013/0292475 A1 | 11/2013 | Kotlarsky et al. | |
| 2013/0292477 A1 | 11/2013 | Hennick et al. | |
| 2013/0293539 A1 | 11/2013 | Hunt et al. | |
| 2013/0293540 A1 | 11/2013 | Laffargue et al. | |
| 2013/0306728 A1 | 11/2013 | Thuries et al. | |
| 2013/0306731 A1 | 11/2013 | Pedraro | |
| 2013/0307964 A1 | 11/2013 | Bremer et al. | |
| 2013/0308625 A1 | 11/2013 | Park et al. | |
| 2013/0313324 A1 | 11/2013 | Koziol et al. | |
| 2013/0332524 A1 | 12/2013 | Fiala et al. | |
| 2013/0342717 A1 | 12/2013 | Havens et al. | |
| 2014/0001267 A1 | 1/2014 | Giordano et al. | |
| 2014/0002828 A1 | 1/2014 | Laffargue et al. | |
| 2014/0008439 A1 | 1/2014 | Wang | |
| 2014/0019242 A1 | 1/2014 | Reichert | |
| 2014/0025584 A1 | 1/2014 | Liu et al. | |
| 2014/0100813 A1 | 1/2014 | Showering | |
| 2014/0034734 A1 | 2/2014 | Sauerwein | |
| 2014/0036848 A1 | 2/2014 | Pease et al. | |
| 2014/0039693 A1 | 2/2014 | Havens et al. | |
| 2014/0049120 A1 | 2/2014 | Kohtz et al. | |
| 2014/0049635 A1 | 2/2014 | Laffargue et al. | |
| 2014/0061306 A1 | 3/2014 | Wu et al. | |
| 2014/0063289 A1 | 3/2014 | Hussey et al. | |
| 2014/0066136 A1 | 3/2014 | Sauerwein et al. | |
| 2014/0067692 A1 | 3/2014 | Ye et al. | |
| 2014/0070005 A1 | 3/2014 | Nahill et al. | |
| 2014/0071840 A1 | 3/2014 | Venancio | |
| 2014/0074746 A1 | 3/2014 | Wang | |
| 2014/0076974 A1 | 3/2014 | Havens et al. | |
| 2014/0078341 A1 | 3/2014 | Havens et al. | |
| 2014/0078342 A1 | 3/2014 | Li et al. | |
| 2014/0078345 A1 | 3/2014 | Showering | |
| 2014/0098792 A1 | 4/2014 | Wang et al. | |
| 2014/0100774 A1 | 4/2014 | Showering | |
| 2014/0103115 A1 | 4/2014 | Meier et al. | |
| 2014/0104413 A1 | 4/2014 | McCloskey et al. | |
| 2014/0104414 A1 | 4/2014 | McCloskey et al. | |
| 2014/0104416 A1 | 4/2014 | Giordano et al. | |
| 2014/0106725 A1 | 4/2014 | Sauerwein | |
| 2014/0108010 A1 | 4/2014 | Maltseff et al. | |
| 2014/0108402 A1 | 4/2014 | Gomez et al. | |
| 2014/0108682 A1 | 4/2014 | Caballero | |
| 2014/0110485 A1 | 4/2014 | Toa et al. | |
| 2014/0114530 A1 | 4/2014 | Fitch et al. | |
| 2014/0121438 A1 | 5/2014 | Long et al. | |
| 2014/0121445 A1 | 5/2014 | Fontenot et al. | |
| 2014/0124577 A1 | 5/2014 | Wang et al. | |
| 2014/0124579 A1 | 5/2014 | Ding | |
| 2014/0125842 A1 | 5/2014 | Winegar | |
| 2014/0125853 A1 | 5/2014 | Wang | |
| 2014/0125999 A1 | 5/2014 | Longacre et al. | |
| 2014/0129378 A1 | 5/2014 | Richardson | |
| 2014/0131441 A1 | 5/2014 | Nahill et al. | |
| 2014/0131443 A1 | 5/2014 | Smith | |
| 2014/0131444 A1 | 5/2014 | Wang | |
| 2014/0133379 A1 | 5/2014 | Wang et al. | |
| 2014/0136208 A1 | 5/2014 | Maltseff et al. | |
| 2014/0140585 A1 | 5/2014 | Wang | |
| 2014/0151453 A1 | 6/2014 | Meier et al. | |
| 2014/0152882 A1 | 6/2014 | Samek et al. | |
| 2014/0158770 A1 | 6/2014 | Sevier et al. | |
| 2014/0159869 A1 | 6/2014 | Zumsteg et al. | |
| 2014/0166755 A1 | 6/2014 | Liu et al. | |
| 2014/0166757 A1 | 6/2014 | Smith | |
| 2014/0168787 A1 | 6/2014 | Wang et al. | |
| 2014/0175165 A1 | 6/2014 | Havens et al. | |
| 2014/0191913 A1 | 7/2014 | Ge et al. | |
| 2014/0197239 A1 | 7/2014 | Havens et al. | |
| 2014/0197304 A1 | 7/2014 | Feng et al. | |
| 2014/0204268 A1 | 7/2014 | Grunow et al. | |
| 2014/0214631 A1 | 7/2014 | Hansen | |
| 2014/0217166 A1 | 8/2014 | Berthiaume et al. | |
| 2014/0217180 A1 | 8/2014 | Liu | |
| 2014/0231500 A1 | 8/2014 | Ehrhart et al. | |
| 2014/0247315 A1 | 9/2014 | Marty et al. | |
| 2014/0263493 A1 | 9/2014 | Amurgis et al. | |
| 2014/0263645 A1 | 9/2014 | Smith et al. | |
| 2014/0270196 A1 | 9/2014 | Braho et al. | |
| 2014/0270229 A1 | 9/2014 | Braho | |
| 2014/0278387 A1 | 9/2014 | DiGregorio | |
| 2014/0282210 A1 | 9/2014 | Bianconi | |
| 2014/0288933 A1 | 9/2014 | Braho et al. | |
| 2014/0297058 A1 | 10/2014 | Barker et al. | |
| 2014/0299665 A1 | 10/2014 | Barber et al. | |
| 2014/0316639 A1* | 10/2014 | Braswell | G07C 5/008 701/29.6 |
| 2014/0351317 A1 | 11/2014 | Smith et al. | |
| 2014/0362184 A1 | 12/2014 | Jovanovski et al. | |
| 2014/0363015 A1 | 12/2014 | Braho | |
| 2014/0369511 A1 | 12/2014 | Sheerin et al. | |

(56) References Cited

U.S. PATENT DOCUMENTS

| | | |
|---|---|---|
| 2014/0374483 A1 | 12/2014 | Lu |
| 2014/0374485 A1 | 12/2014 | Xian et al. |
| 2015/0001301 A1 | 1/2015 | Ouyang |
| 2015/0009338 A1 | 1/2015 | Laffargue et al. |
| 2015/0014416 A1 | 1/2015 | Kotlarsky et al. |
| 2015/0021397 A1 | 1/2015 | Rueblinger et al. |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0049347 A1 | 2/2015 | Laffargue et al. |
| 2015/0051992 A1 | 2/2015 | Smith |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0088522 A1 | 3/2015 | Hendrickson et al. |
| 2015/0096872 A1 | 4/2015 | Woodburn |
| 2015/0100196 A1 | 4/2015 | Hollifield |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0149946 A1 | 5/2015 | Benos et al. |
| 2015/0161429 A1 | 6/2015 | Xian |
| 2015/0186703 A1 | 7/2015 | Chen et al. |
| 2015/0199957 A1 | 7/2015 | Funyak et al. |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0310243 A1 | 10/2015 | Ackley |
| 2015/0310389 A1 | 10/2015 | Crimm et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0062473 A1 | 3/2016 | Bouchat et al. |
| 2016/0092805 A1 | 3/2016 | Geisler et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr et al. |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Linwood |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Pecorari et al. |
| 2016/0189092 A1 | 6/2016 | George et al. |
| 2016/0189284 A1 | 6/2016 | Mellott et al. |
| 2016/0189288 A1 | 6/2016 | Todeschini |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | DiPiazza et al. |
| 2016/0192051 A1 | 6/2016 | DiPiazza et al. |
| 2016/0125873 A1 | 7/2016 | Braho et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggert et al. |
| 2016/0204636 A1 | 7/2016 | Allen et al. |
| 2016/0204638 A1 | 7/2016 | Miraglia et al. |
| 2016/0316190 A1 | 7/2016 | McCloskey et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Geramine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van Horn et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress |
| 2017/0092908 A1 | 3/2017 | Chaney |
| 2017/0094238 A1 | 3/2017 | Germaine et al. |

(56) References Cited

U.S. PATENT DOCUMENTS

| | | |
|---|---|---|
| 2017/0098947 A1 | 4/2017 | Wolski |
| 2017/0100949 A1 | 4/2017 | Celinder et al. |
| 2017/0108838 A1 | 4/2017 | Todeschini et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | d'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delario et al. |
| 2017/0193432 A1 | 7/2017 | Bernhardt |
| 2017/0193461 A1 | 7/2017 | Jonas et al. |
| 2017/0193727 A1 | 7/2017 | Van Horn et al. |
| 2017/0200108 A1 | 7/2017 | Au et al. |
| 2017/0200275 A1 | 7/2017 | McCloskey et al. |

OTHER PUBLICATIONS

Exam Report in related EP Application 14167806.0, dated Nov. 30, 2015, 5 pages.
Examination Report in related European Application No. 14167806.0 dated Feb. 20, 2019, pp. 1-3.
Notice of Allowance for U.S. Appl. No. 13/902,242, dated Nov. 17, 2017, 7 pages.
Office Action for U.S. Appl. No. 13/902,242, dated Dec. 30, 2016, 8 pages.
Office Action for U.S. Appl. No. 13/902,242, dated Feb. 26, 2015, 11 pages.
Office Action for U.S. Appl. No. 13/902,242, dated Jul. 31, 2015, 15 pages.
Office Action for U.S. Appl. No. 13/902,242, dated Jul. 6, 2016, 18 pages.
Office Action for U.S. Appl. No. 13/902,242, dated Jun. 27, 2017, 10 pages.
Office Action received for European Patent Application No. 14167806.0, dated Feb. 27, 2018, 3 pages.
Office Action received for European Patent Application No. 14167806.0, dated Sep. 4, 2019, 3 pages.
Office Action received for European Patent Application No. 14167806.0, dated Sep. 13, 2016, 3 pages.
U.S. Patent Application for a Laser Scanning Module Employing an Elastomeric U-Hinge Based Laser Scanning Assembly, filed Feb. 7, 2012 (Feng et al.), U.S. Appl. No. 13/367,978.
Examination Report for European Application No. 14167806.0, dated Jan. 30, 2020, 3 pages.
Advisory Action (PTOL-303) dated Dec. 17, 2015 for U.S. Appl. No. 13/902,242.
Advisory Action (PTOL-303) dated Mar. 30, 2017 for U.S. Appl. No. 13/902,242.
Advisory Action (PTOL-303) dated Oct. 15, 2015 for U.S. Appl. No. 13/902,242.
Applicant Initiated Interview Summary (PTOL-413) dated Sep. 30, 2015 for U.S. Appl. No. 13/902,242.
Annex to the communication dated Sep. 4, 2020 for EP Application No. 14167806.
Communication from the Examining Division dated Sep. 4, 2020 for EP Application No. 14167806.

* cited by examiner

FIG. 4 ical businesses, and other businesses having a need to manage large amounts of inventory. Symbol reading devices are often employed to read barcodes. A barcode is a machine-readable representation of information in a graphic format. The most familiar of these graphic symbols is a series of parallel bars and spaces of varying widths, which format gave rise to the term "barcode." The adoption of the Universal Product Code (UPC) version of barcode technology in 1973 quickly led to a revolution in logistics by obviating the need for manual entry of long number strings.

SYSTEM FOR PROVIDING A CONTINUOUS COMMUNICATION LINK WITH A SYMBOL READING DEVICE

CROSS-REFERENCE TO RELATED APPLICATION

The present application claims the benefit of U.S. patent application Ser. No. 13/902,242 for a System for Providing a Continuous Communication Link with a Symbol Reading Device filed May 24, 2013 (and published Nov. 27, 2014 as U.S. Patent Application Publication No. 2014/0351317), now U.S. Pat. No. 9,930,142. Each of the foregoing patent application, patent publication, and patent is hereby incorporated by reference in its entirety.

BACKGROUND

Field of Disclosure

The present disclosure generally relates to information systems. More particularly, the present disclosure relates to a system for providing a continuous communication link with a symbol reading device, and a symbol reading device adapted for use in such a system.

BRIEF OVERVIEW OF THE STATE OF THE ART

A symbol reading device (e.g., barcode scanner, barcode reader, RFID reader) is a specialized input device for certain data systems commonly used by retailers, industrial businesses, and other businesses having a need to manage large amounts of inventory. Symbol reading devices are often employed to read barcodes. A barcode is a machine-readable representation of information in a graphic format. The most familiar of these graphic symbols is a series of parallel bars and spaces of varying widths, which format gave rise to the term "barcode." The adoption of the Universal Product Code (UPC) version of barcode technology in 1973 quickly led to a revolution in logistics by obviating the need for manual entry of long number strings.

Most barcode scanners operate by projecting light from an LED or a laser onto the printed barcode, and then detecting the level of reflected light as the light beam sweeps across the barcode. Using this technique, the barcode scanner is able to distinguish between dark areas and light areas on the barcode. The barcode scanner can determine the width of each bar or white space and then decode the symbol to determine the represented data.

Although the basic concept behind barcode scanning technology has remained constant, the techniques employed continue to evolve. Recent trends include the widespread use of 2D barcodes (i.e., matrix codes), which provide for the representation of data in two dimensions. The QR Code is an example of a 2D barcode in wide use today, especially in the area of interactive marketing.

Typically, the barcode scanner transmits the data that it decodes from reading the barcode to a host device, which host device is configured to process the data in some useful way. In the retail context, where the barcode scanner is used in conjunction with the sale of products to the consumer, these host devices and their accompanying barcode scanners are often referred to as point-of-sale (POS) systems. The most ubiquitous example of the point-of-sale system is the checkout register at a supermarket, where an omni-directional barcode scanner reads the UPC code on grocery purchases. The barcode scanner passes the UPC code associated with each product along to the cash register, which then looks up the price associated with each product code. The communication link between the barcode scanner and the host device is often either an RS-232 serial connection or a universal serial bus (USB) connection.

The useful life of barcode scanners can be extended and functionality enhanced by updating the barcode scanner's software (e.g., firmware). In situations where the host device features a full-featured operating system capable of running software (e.g., Microsoft WINDOWS®) adapted to update the barcode scanner's firmware, a system administrator can update the firmware via the host device, either directly or through a network connection to the host device. Many host systems are not capable of directly supporting an upgrade of the barcode scanner firmware. Low-end retail host devices, such as certain electronic cash registers, may not be PC-based or may not be running complete operating systems. In addition, certain factors may prohibit a business from providing a network connection to certain host devices, making it impossible to remotely upgrade the barcode scanner firmware. Because these host devices cannot provide the necessary interface to upgrade the barcode scanner firmware, when performing system maintenance, it is necessary to disconnect the barcode scanner from the host device and then reconnect the barcode scanner to a suitable upgrade system, such as a PC-based laptop computer. Once the upgrade of the firmware is complete, the upgrade system is disconnected and the communication link between the barcode scanner and the host device is re-established.

The problem with this approach to upgrading a barcode scanner's firmware is that it is time-consuming, labor intensive, and results in the point-of-sale system, for example, being offline for the duration of the upgrade process. In environments employing many host device-barcode scanner pairings, the costs and delays brought about by this labor-intensive upgrade technique can be quite burdensome on a business.

What is needed is a system for providing communication to a symbol reading device, such as a barcode reader, that allows continuous access to the symbol reading device through a server computer even in situations where the host device is incapable of providing access to the symbol reading device for purposes of upgrading the symbol reading device's firmware. A system that provided an additional means of communicating with the symbol reading device beyond the communication link with the host device would not only allow for remote upgrading of the symbol reading device's firmware but would allow for the transfer of data from the symbol reading device to systems other than the host device for additional data processing or data collection purposes.

OBJECTS OF PRESENT DISCLOSURE

A primary object of the present disclosure is to provide a system for providing a continuous communication link with a symbol reading device.

Another object of the present disclosure is to provide a system for providing a continuous communication link with a symbol reading device wherein a continuous communication link exists between the symbol reading device and a server computer and a continuous communication link exists between the symbol reading device and the host device.

Another object of the present disclosure is to provide a system for providing a continuous communication link with a symbol reading device wherein the symbol reading device has a communications module having a first interface for communicating with a host device and a second interface for communicating with a server computer.

Another object of the present disclosure is to provide a system for providing a continuous communication link with a symbol reading device wherein the symbol reading device's firmware may be updated without the need for disconnecting the symbol reading device from the host device even in situations where the host device is not suitable for providing access to the symbol reading device for the purpose of upgrading the firmware.

Another object of the present disclosure is to provide a system for providing a continuous communication link with a symbol reading device that allows for the upgrading of the symbol reading device's firmware with a reduced amount of time, labor and downtime when compared with conventional upgrade techniques.

Another object of the present disclosure is to provide a symbol reading device having the capability of separately communicating with a host device and a server computer.

Another object of the present disclosure is to provide a system whereby a server computer can collect data from a symbol reading device while the symbol reading device remains in continuous communication with a host device.

Further objects of the present disclosure will become more apparently understood hereinafter and in the claims appended hereto.

BRIEF DESCRIPTION OF THE DRAWINGS

To more fully understand the objects, the following detailed description of the illustrative embodiments should be read in conjunction with the accompanying drawings, wherein.

DETAILED DESCRIPTION OF THE ILLUSTRATIVE EMBODIMENTS

Referring to the figures in the accompanying drawings, the illustrative embodiments of the system for providing a continuous communication link with a symbol reading device, and the symbol reading device according to the present disclosure will be described in great detail, wherein like elements will be indicated using like reference numerals.

It will be understood that the system for providing a continuous communication link with a symbol reading device of the illustrative embodiments may be modified in a variety of ways which will become readily apparent to those skilled in the art having the benefit of the novel teachings disclosed herein. All such modifications and variations of the illustrative embodiments thereof shall be deemed to be within the scope of the claims appended hereto.

In one aspect, the present disclosure embraces a system for providing a continuous communication link with a symbol reading device. The system includes a symbol reading device having a controller module. The system also includes a communications module in communication with the controller module of the symbol reading device. The system further includes a host device in communication with the communications module and a server computer in communication with the communications module.

In another aspect, the present disclosure embraces a symbol reading device. The symbol reading device according to the present disclosure includes a controller module for converting a symbol into data; a communications module for transmitting data, the communications module in communication with the controller module; wherein the communications module has a first interface for communicating with a host device and a second interface for communicating with a server computer.

Figure 1:
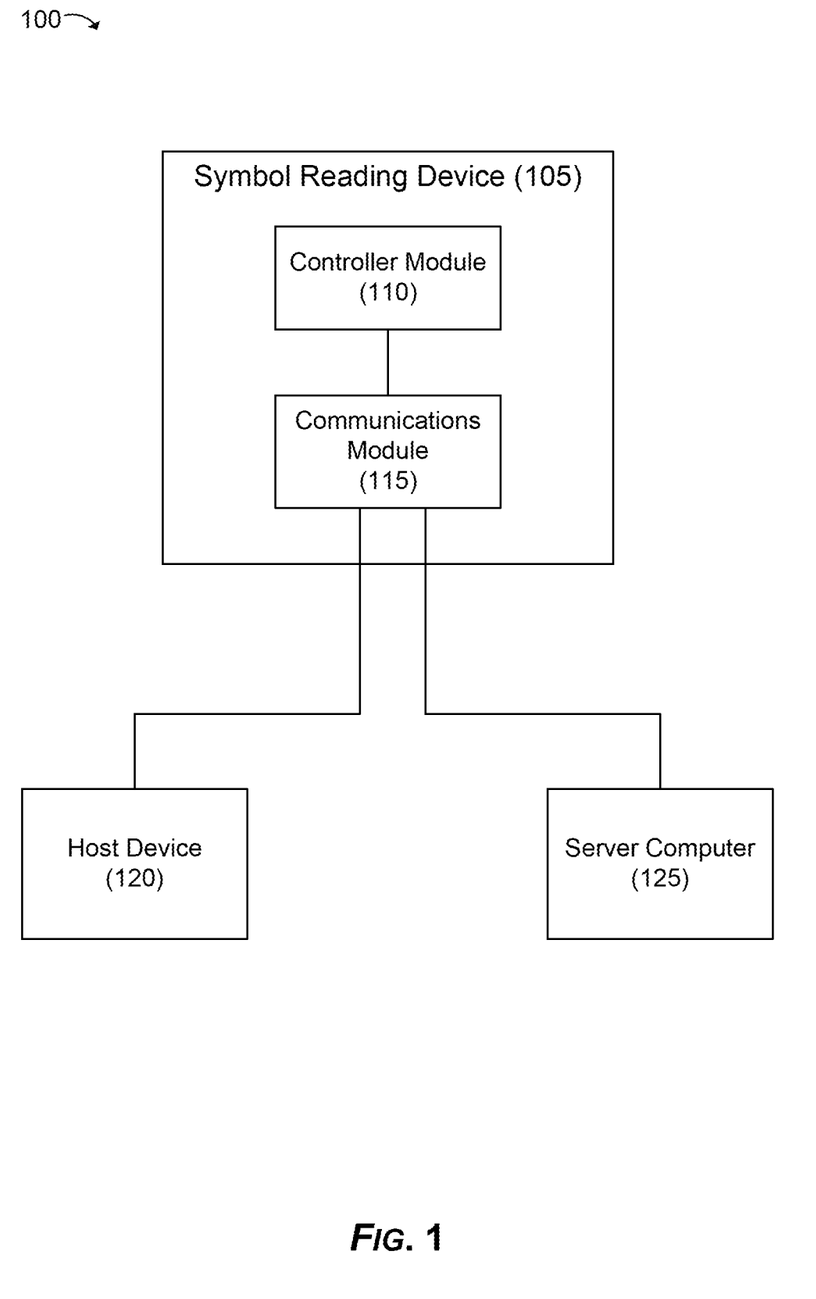
FIG. 1 is a schematic block diagram of an exemplary system for providing a continuous communication link with a symbol reading device according to the present disclosure.

Referring now to FIG. 1, the system 100 includes a symbol reading device 105. It will be understood that the symbol reading device may be any one of the various types of device intended for reading (e.g., decoding, interpreting) symbols (e.g., barcodes, RFID tags). Such symbol reading device 105 may be a pen-type barcode reader (e.g., wand barcode reader), laser barcode scanners, CCD barcode readers, camera-based barcode readers, omni-directional barcode scanners, RFID readers, or any similar device. It will be further understood that the term "barcode" is intended to broadly encompass insignia used to represent data, including various types of linear barcodes (i.e., 1D barcodes) and matrix barcodes (i.e., 2D barcodes). The symbol reading device 105 includes a controller module 110 that decodes the symbol, for example by converting readings of light reflected off a barcode into data (e.g., a product identification number, a shipment number, an account number, etc.).

The system 100 also includes a communications module 115. The communications module 115 is in communication with the controller module 110 by means suitable for allowing data to be transmitted from the controller module 110 to the communications module 115. Typically, the communications module 115 will be integral with the symbol reading device. The communications module 115 is adapted to communicate with a host device 120. It will be understood that the term "host device" is intended to broadly encompass the great variety of devices adapted to communicate with a symbol reading device 105. Examples of such host devices include, without limitation, electronic cash registers, inventory management systems, and inventory control systems. Typically, the communications module 115 is connected to the host device 120 via an RS-232 serial connection or a universal serial bus (USB) connection. The communications module 115 may be communicatively connected to the host device 120 in other ways, including by a wireless communication link (e.g., wireless radio (e.g., ZIGBEE, BLUETOOTH, WI-FI) and infrared transmissions).

The system 100 also includes a server computer 125. The server computer 125 is in communication with the communications module 115. The term server computer 125 is intended to be used broadly to encompass any computer or network of computers capable of running a software application adapted to upload information (e.g., updates to firmware) to the symbol reading device 105, and/or adapted to process information received from the symbol reading device 105. The communication link between the server computer 125 and the symbol reading device 105 may be established by various means, including by wired and wireless connections. This communication link between the server computer 125 and the symbol reading device 105 provides access to the scanning device 105 without the need to interrupt the communication link between the symbol reading device 105 and the host device 120. It will be understood that references in the disclosure to a continuous communication link are intended to indicate the existence of a continuing physical connection (e.g., wired or wireless connection) enabling communication (e.g., enabling the exchange of information on an as-needed basis). Such references are not intended to suggest that the system requires information to be communicated among system components at all times. Indeed, one of the advantages of the system 100 is that it allows for communication between the server computer 125 and the symbol reading device 105 as frequently or as infrequently as may be needed.

Figure 2:
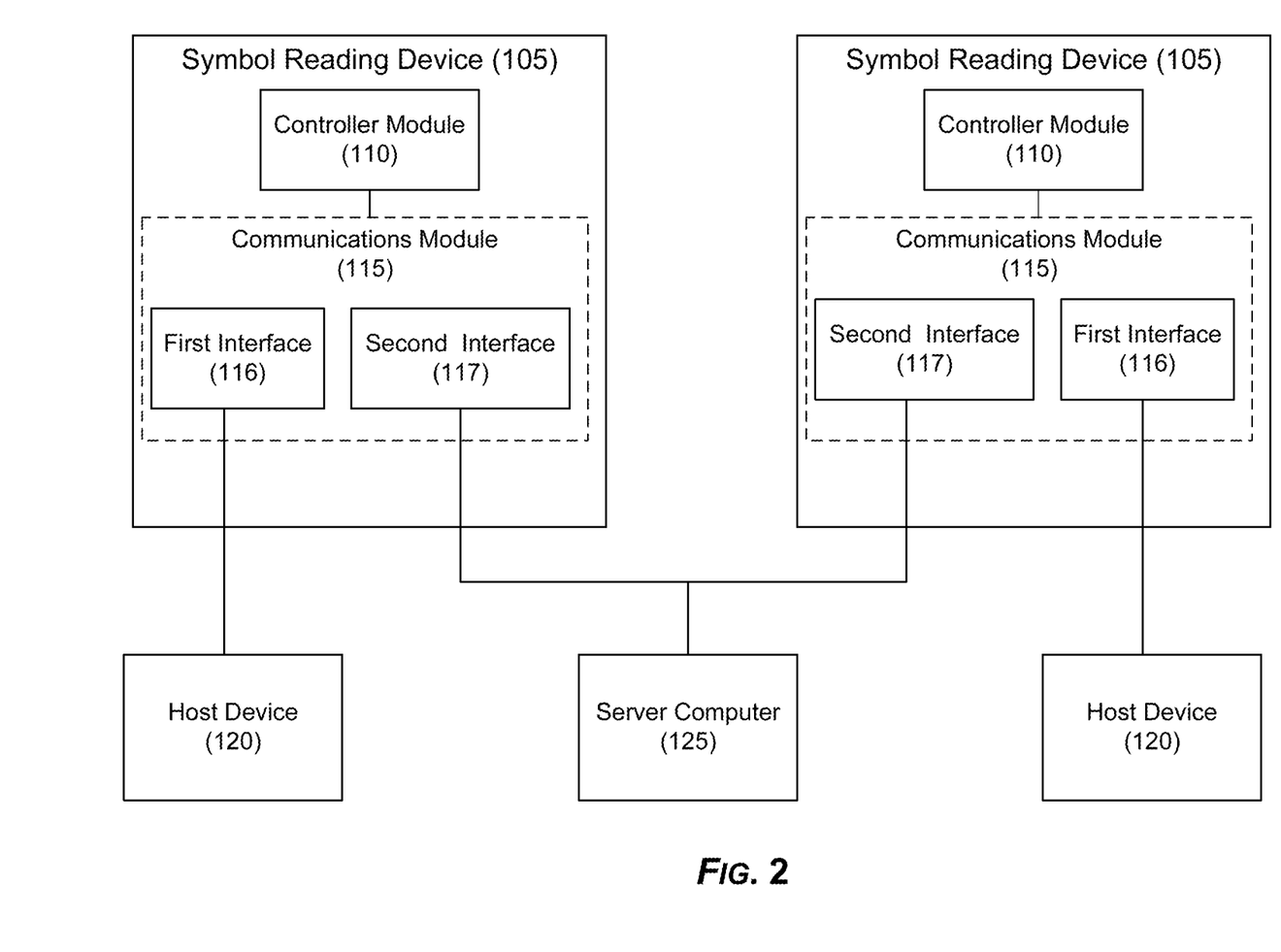
FIG. 2 is a schematic block diagram of an exemplary system for providing a continuous communication link with a symbol reading device according to the present disclosure.

As illustrated in FIG. 2, in one embodiment, the communications module 115 comprises a first interface 116 for communicating with the host device 120 and a second interface 117 for communicating with the server computer 125. The first interface 116 may be a separate component from the second interface 117 or it may be integral with the second interface 117. Typically, the first interface 116 is an RS-232 serial interface or a USB interface. Alternatively, the first interface 116 may be a wireless interface of the type that is well-known to a person of ordinary skill in the art.

The communication link between the symbol reading device 105 and the server computer 125 may be wired or wireless. Accordingly, the second interface 117 may comprise a wired technology interface (e.g., cabled Ethernet) or a wireless technology interface. A wireless connection may be advantageous in circumstances where running cable from the scanning device would be difficult or overly costly due to the nature of the building infrastructure or the distances involved, or when the use of cabling would inhibit the use of the symbol reading device 105 (e.g., when using a handheld device). For example, the second interface 117 may comprise a wireless personal area network interface (e.g., a BLUETOOTH interface or a ZIGBEE interface) allowing the symbol reading device 105 to communicate with the server computer 125 via a radio connection using a BLUETOOTH or ZIGBEE standard. A BLUETOOTH connection may also be advantageous because that standard allows for peer-to-peer connections between multiple devices in the personal area network. In this way, multiple symbol reading devices 105 could be wirelessly linked in a personal area network that is in communication with the system 100 through a master device. Alternatively, the second interface 117 may comprise a wireless local area network interface (WLAN) (e.g., WI-FI or 802.11x interface) or a wireless wide area network interface (WWAN) (e.g., GSM, CDMA, GPAS). It will be appreciated by one of ordinary skill in the art that symbol reading devices 105 connected to a server computer 125 using any of these techniques will be accessible by the server computer 125 and any computer (e.g., client computer) networked to the server computer 125. If the server computer 125 is connected to the Internet, then the symbol reading device may be assigned an Internet Protocol (IP) address, making it a uniquely identifiable node on the network. Therefore, the symbol reading device 105 can be remotely accessed by any other authorized computer on the network via the server computer 125. It will be appreciated that those systems 100 that incorporate many (e.g., hundreds) individual symbol reading devices 105 will particularly benefit from the remote access via a server computer 125, which remote access allows for much faster updating of these symbol reading devices 105 via the network than the traditional technique requiring the symbol reading device 105 to be disconnected from the host device 120 before any updating of the firmware can commence.

As depicted in FIG. 2, in one embodiment the communication link between the first interface 116 and the host device 120 is parallel to the communication link between the second interface 117 and the server computer 125. In this configuration the system 100 allows the symbol reading device 105 to transmit one set of data to the host device 120 and another set of data to the server computer 125. For example, the communication link to the host device 120 might typically carry only decoded barcode data transmissions, whereas the communication link to the server computer 120 might carry other types of data, including number of trigger pulls, time to decode, barcode quality or images of scanned barcodes.

Figure 3:
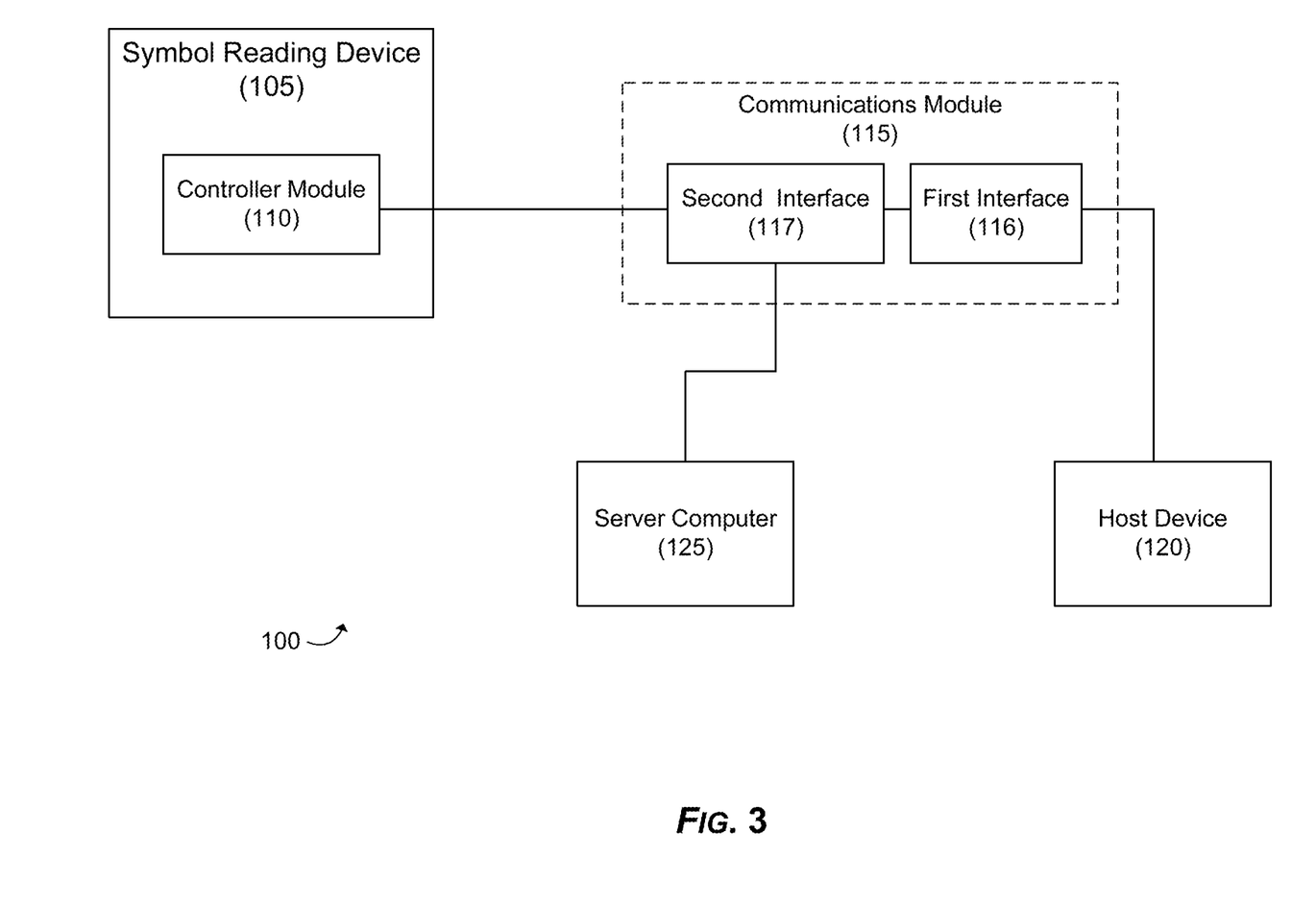
FIG. 3 is a schematic block diagram of an exemplary system for providing a continuous communication link with a symbol reading device according to the present disclosure.

FIG. 3 depicts an alternative configuration of the system 100 according to the present disclosure. In this configuration, the first interface 116 and the second interface 117 are connected in a serial fashion to the controller module (i.e., the second interface 117 and the second interface 117 are in shared communication with the controller module 110). In this configuration, the second interface 117 receives data from the controller module 110 and either transmits the data to the server computer 125 or passes the data through to the first interface 116 to be transmitted to the host device 120, or does both. This configuration might be advantageous in a system 100 where there is a cabled connection (e.g., RS-232 connection) between the symbol reading device 105 and the host device 120, and the second interface 117 is a wireless radio interface positioned within the cabling (e.g., a wireless radio pod incorporated into the cabling) connecting the symbol reading device 105 and the host device 120.

Figure 4:
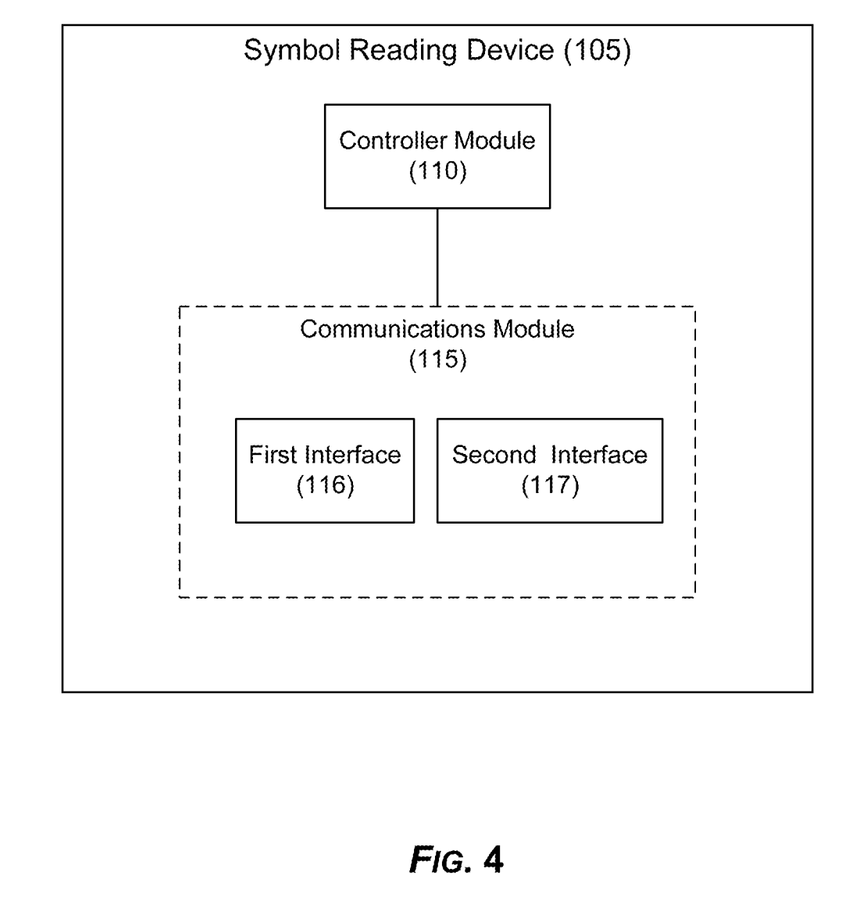
FIG. 4 is a schematic block diagram of an exemplary symbol reading device according to the present disclosure.

Turning now to FIG. 4, the disclosure alternatively embraces a symbol reading device 105 adapted for use with the system 100 according to the present disclosure. The symbol reading device 105 includes a controller module 110 for converting a symbol into data. The symbol reading device 105 also includes a communications module 115 for transmitting data. The communications module 115 is in communication with the controller module 110. The communication module 115 comprises a first interface 116 for communicating with a host device and a second interface 117 for communicating with a server computer 125. The second interface 117 may be wired (e.g., Ethernet network interface) or wireless (e.g., wireless personal area network interface, wireless local area network interface, or wireless wide area network interface).

To supplement the present disclosure, this application incorporates entirely by reference the following patents, patent application publications, and patent applications: U.S. Pat. No. 6,832,725; U.S. Pat. No. 7,159,783; U.S. Pat. No. 7,413,127; U.S. Pat. No. 8,390,909; U.S. Pat. No. 8,294,969; U.S. Pat. No. 8,408,469; U.S. Pat. No. 8,408,468; U.S. Pat. No. 8,381,979; U.S. Pat. No. 8,408,464; U.S. Pat. No. 8,317,105; U.S. Pat. No. 8,366,005; U.S. Pat. No. 8,424,768; U.S. Pat. No. 8,322,622; U.S. Pat. No. 8,371,507; U.S. Pat. No. 8,376,233; U.S. Pat. No. 8,457,013; U.S. Pat. No. 8,448,863; U.S. Patent Application Publication No. 2012/0111946; U.S. Patent Application Publication No. 2012/0223141; U.S. Patent Application Publication No. 2012/0193423; U.S. Patent Application Publication No. 2012/0203647; U.S. Patent Application Publication No. 2012/0248188; U.S. Patent Application Publication No. 2012/0228382; U.S. Patent Application Publication No. 2012/0193407; U.S. Patent Application Publication No. 2012/0168511; U.S. Patent Application Publication No. 2010/0168512; U.S. Patent Application Publication No. 2010/0177749; U.S. Patent Application Publication No. 2010/0177080; U.S. Patent Application Publication No. 2010/

0177707; U.S. Patent Application Publication No. 2010/0177076; U.S. Patent Application Publication No. 2009/0134221; U.S. Patent Application Publication No. 2012/0318869; U.S. Patent Application Publication No. 2013/0043312; U.S. Patent Application Publication No. 2013/0068840; U.S. Patent Application Publication No. 2013/0070322; U.S. Patent Application Publication No. 2013/0075168; U.S. Patent Application Publication No. 2013/0056285; U.S. Patent Application Publication No. 2013/0075464; U.S. Patent Application Publication No. 2013/0082104; U.S. Patent Application Publication No. 2010/0225757; U.S. patent application Ser. No. 13/347,219 for an OMNIDIRECTIONAL LASER SCANNING BAR CODE SYMBOL READER GENERATING A LASER SCANNING PATTERN WITH A HIGHLY NON-UNIFORM SCAN DENSITY WITH RESPECT TO LINE ORIENTATION, filed Jan. 10, 2012 (Good); U.S. patent application Ser. No. 13/347,193 for a HYBRID-TYPE BIOPTICAL LASER SCANNING AND DIGITAL IMAGING SYSTEM EMPLOYING DIGITAL IMAGER WITH FIELD OF VIEW OVERLAPPING FIELD OF FIELD OF LASER SCANNING SUBSYSTEM, filed Jan. 10, 2012 (Kearney et al.); U.S. patent application Ser. No. 13/367,047 for LASER SCANNING MODULES EMBODYING SILICONE SCAN ELEMENT WITH TORSIONAL HINGES, filed Feb. 6, 2012 (Feng et al.); U.S. patent application Ser. No. 13/400,748 for a LASER SCANNING BAR CODE SYMBOL READING SYSTEM HAVING INTELLIGENT SCAN SWEEP ANGLE ADJUSTMENT CAPABILITIES OVER THE WORKING RANGE OF THE SYSTEM FOR OPTIMIZED BAR CODE SYMBOL READING PERFORMANCE, filed Feb. 21, 2012 (Wilz); U.S. patent application Ser. No. 13/432,197 for a LASER SCANNING SYSTEM USING LASER BEAM SOURCES FOR PRODUCING LONG AND SHORT WAVELENGTHS IN COMBINATION WITH BEAM-WAIST EXTENDING OPTICS TO EXTEND THE DEPTH OF FIELD THEREOF WHILE RESOLVING HIGH RESOLUTION BAR CODE SYMBOLS HAVING MINIMUM CODE ELEMENT WIDTHS, filed Mar. 28, 2012 (Havens et al.); U.S. patent application Ser. No. 13/492,883 for a LASER SCANNING MODULE WITH ROTATABLY ADJUSTABLE LASER SCANNING ASSEMBLY, filed Jun. 10, 2012 (Hennick et al.); U.S. patent application Ser. No. 13/367,978 for a LASER SCANNING MODULE EMPLOYING AN ELASTOMERIC U-HINGE BASED LASER SCANNING ASSEMBLY, filed Feb. 7, 2012 (Feng et al.); U.S. patent application Ser. No. 13/852,097 for a System and Method for Capturing and Preserving Vehicle Event Data, filed Mar. 28, 2013 (Barker et al.); U.S. patent application Ser. No. 13/780,356 for a Mobile Device Having Object-Identification Interface, filed Feb. 28, 2013 (Samek et al.); U.S. patent application Ser. No. 13/780,158 for a Distraction Avoidance System, filed Feb. 28, 2013 (Sauerwein); U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/780,196 for Android Bound Service Camera Initialization, filed Feb. 28, 2013 (Todeschini et al.); U.S. patent application Ser. No. 13/792,322 for a Replaceable Connector, filed Mar. 11, 2013 (Skvoretz); U.S. patent application Ser. No. 13/780,271 for a Vehicle Computer System with Transparent Display, filed Feb. 28, 2013 (Fitch et al.); U.S. patent application Ser. No. 13/736,139 for an Electronic Device Enclosure, filed Jan. 8, 2013 (Chaney); U.S. patent application Ser. No. 13/771,508 for an Optical Redirection Adapter, filed Feb. 20, 2013 (Anderson); U.S. patent application Ser. No. 13/750,304 for Measuring Object Dimensions Using Mobile Computer, filed Jan. 25, 2013; U.S. patent application Ser. No. 13/471,973 for Terminals and Methods for Dimensioning Objects, filed May 15, 2012; U.S. patent application Ser. No. 13/895,846 for a Method of Programming a Symbol Reading System, filed Apr. 10, 2013 (Corcoran); U.S. patent application Ser. No. 13/867,386 for a Point of Sale (POS) Based Checkout System Supporting a Customer-Transparent Two-Factor Authentication Process During Product Checkout Operations, filed Apr. 22, 2013 (Cunningham et al.); U.S. patent application Ser. No. 13/888,884 for an Indicia Reading System Employing Digital Gain Control, filed May 7, 2013 (Xian et al.); U.S. patent application Ser. No. 13/895,616 for a Laser Scanning Code Symbol Reading System Employing Multi-Channel Scan Data Signal Processing with Synchronized Digital Gain Control (SDGC) for Full Range Scanning, filed May 16, 2013 (Xian et al.); U.S. patent application Ser. No. 13/897,512 for a Laser Scanning Code Symbol Reading System Providing Improved Control over the Length and Intensity Characteristics of a Laser Scan Line Projected Therefrom Using Laser Source Blanking Control, filed May 20, 2013 (Brady et al.); and U.S. patent application Ser. No. 13/897,634 for a Laser Scanning Code Symbol Reading System Employing Programmable Decode Time-Window Filtering, filed May 20, 2013 (Wilz, Sr. et al.).

In the specification and figures, typical embodiments of the invention have been disclosed. The present invention is not limited to such exemplary embodiments. Unless otherwise noted, specific terms have been used in a generic and descriptive sense and not for purposes of limitation.

The invention claimed is:

1. A symbol reading device, comprising:
 a controller;
 a first interface in data communication with the controller, wherein the first interface is adapted to establish a first communication link to communicate symbol data with a host device, and wherein the symbol data comprises data, decoded by the controller, that is representative of a captured reading of light reflected by a barcode; and
 a second interface in data communication with the controller, wherein the second interface is adapted to establish a second communication link to communicate with a server computer, wherein the second communication link is operable to communicate firmware communications data for updating firmware of the symbol reading device, wherein the first communication link is parallel to the second communication link, and
 wherein the symbol reading device prevents firmware communications data transmitted via the second communication link between the server computer and the second interface from interrupting data communications transmitted via the first communication link between the host device and the first interface.

2. The symbol reading device of claim 1, wherein the second interface comprises a wireless personal area network interface.

3. The symbol reading device of claim 1, wherein the second interface comprises a wireless local area network interface.

4. The symbol reading device of claim 1, wherein the second interface comprises a wireless wide area network interface.

5. The symbol reading device of claim 1, wherein the first interface comprises an RS-232 serial interface.

6. The symbol reading device of claim 1, wherein the first interface comprises a universal serial bus interface.

7. The symbol reading device of claim 1, wherein the first interface comprises an RS-232 serial interface and the second interface comprises a wireless personal area network interface.

8. The symbol reading device of claim 1, wherein the first interface comprises an RS-232 serial interface and the second interface comprises a wireless local area network interface.

9. A system, comprising:
- a symbol reading device comprising a first interface and a second interface;
- a host device in communication with the first interface via a first communication link to receive, from the symbol reading device, data decoded by the controller, that is representative of a captured reading of light reflected by a barcode; and
- a server computer in communication with the second interface via a second communication link for updating firmware of the symbol reading device, wherein the first communication link is parallel to the second communication link, and
- wherein the symbol reading device prevents communications transmitted via the second communication link from interrupting communications transmitted via the first communication link.

10. The system of claim 9, wherein the second interface comprises a wireless personal area network interface.

11. The system of claim 9, wherein the second interface comprises a wireless local area network interface.

12. The system of claim 9, wherein the second interface comprises a wireless wide area network interface.

13. The system of claim 9, wherein the first interface comprises an RS-232 serial interface.

14. The system of claim 9, wherein the first interface comprises a universal serial bus interface.

15. The system of claim 9, wherein the first interface comprises an RS-232 serial interface and the second interface comprises a wireless personal area network interface.

16. The system of claim 9, wherein the first interface comprises an RS-232 serial interface and the second interface comprises a wireless local area network interface.

17. A symbol reading device, comprising:
- a controller; and
- a first interface in data communication with the controller, wherein the first interface is adapted to establish a first communication link to communicate symbol data with a host device and wherein the symbol data comprises data, decoded by the controller, that is representative of a captured reading of light reflected by a barcode; and
- a second interface in data communication with the controller, wherein the second interface is adapted to establish a second communication link to communicate with a server computer, wherein the second communication link is operable to communicate firmware communications data for updating firmware of the symbol reading device, wherein the first communication link is parallel to the second communication link, and
- wherein the symbol reading device prevents communications transmitted via the second interface from interrupting communications transmitted via the first interface.

18. The symbol reading device of claim 17, wherein the second interface comprises a wireless personal area network interface.

19. The symbol reading device of claim 17, wherein the second interface comprises a wireless local area network interface.

20. The symbol reading device of claim 17, wherein the second interface comprises a wireless wide area network interface.

* * * * *